Figure 11:
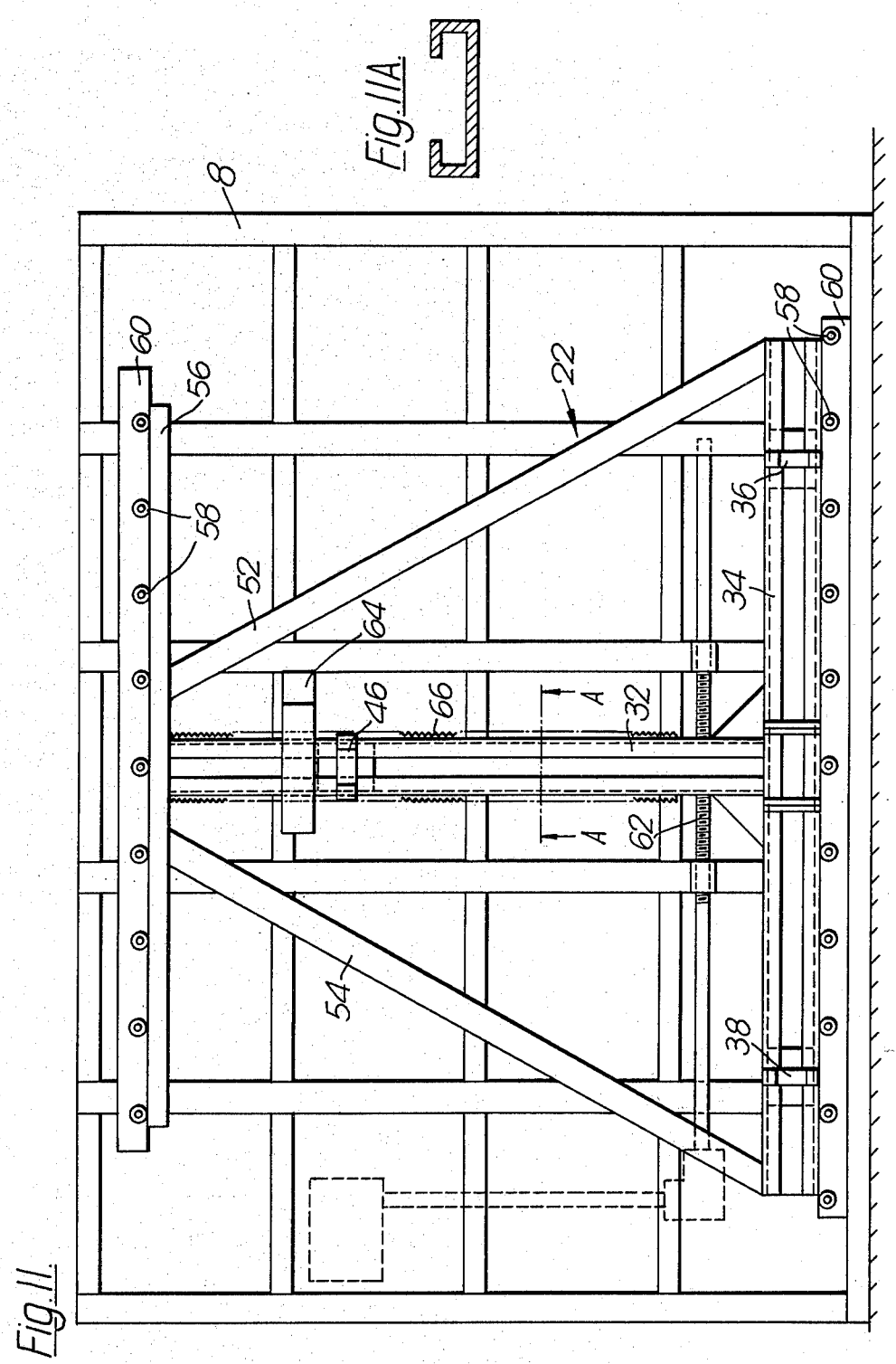

United States Patent [19]

Pesando

[11] 4,234,143
[45] Nov. 18, 1980

[54] TRAVERSING AND HOUSING SYSTEM FOR HELICOPTERS

[75] Inventor: Mario A. Pesando, Mississauga, Canada

[73] Assignee: DAF Indal Ltd., Mississauga, Canada

[21] Appl. No.: 870,698

[22] Filed: Jan. 19, 1978

[30] Foreign Application Priority Data

Jan. 20, 1977 [GB] United Kingdom ............... 2348/77

[51] Int. Cl.³ .............................................. B63B 35/50
[52] U.S. Cl. ..................................... 244/116; 114/71; 114/75; 114/261; 52/67
[58] Field of Search .................. 244/114 R, 115, 116; 52/67; 114/72, 75, 76, 71, 261; 414/240, 241, 253, 259

[56] References Cited

U.S. PATENT DOCUMENTS

| | | | |
|---|---|---|---|
| 1,902,205 | 3/1933 | Webster | 244/114 R |
| 3,248,830 | 5/1966 | Maynard | 52/67 |
| 3,745,725 | 7/1973 | Boucaud | 52/67 |
| 3,785,316 | 1/1974 | Leming | 244/116 |
| 4,099,707 | 7/1978 | Anderson | 104/162 |

FOREIGN PATENT DOCUMENTS 1449442  9/1976 United Kingdom .

Primary Examiner—Trygve M. Blix
Assistant Examiner—D. W. Kern
Attorney, Agent, or Firm—Sughrue, Rothwell, Mion, Zinn and Macpeak

[57] ABSTRACT

A traversing strut and housing system for securing and housing a helicopter aboard a ship. One or more telescoping housing sections are mounted on and movable along a track extending outward from a fixed section. A traverse strut assembly which permits only lateral movement is attached to the end movable section and secures the helicopter to the housing. Once thus secured, the helicopter is rotated to a preferred orientation then moved into its stored position.

4 Claims, 15 Drawing Figures

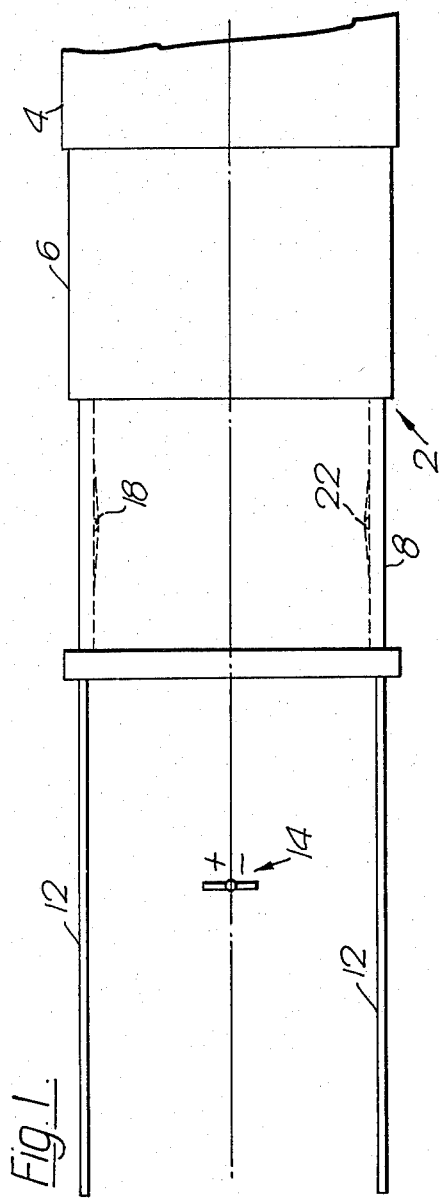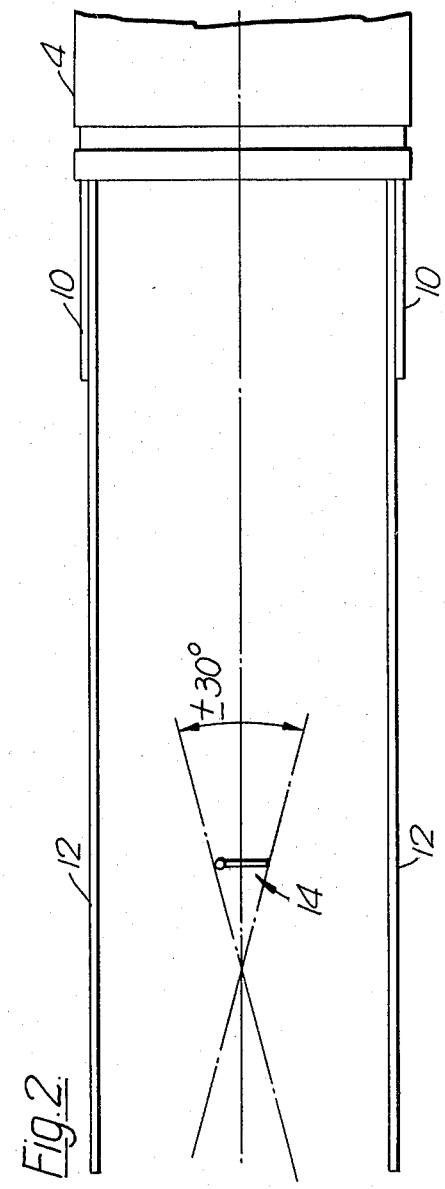

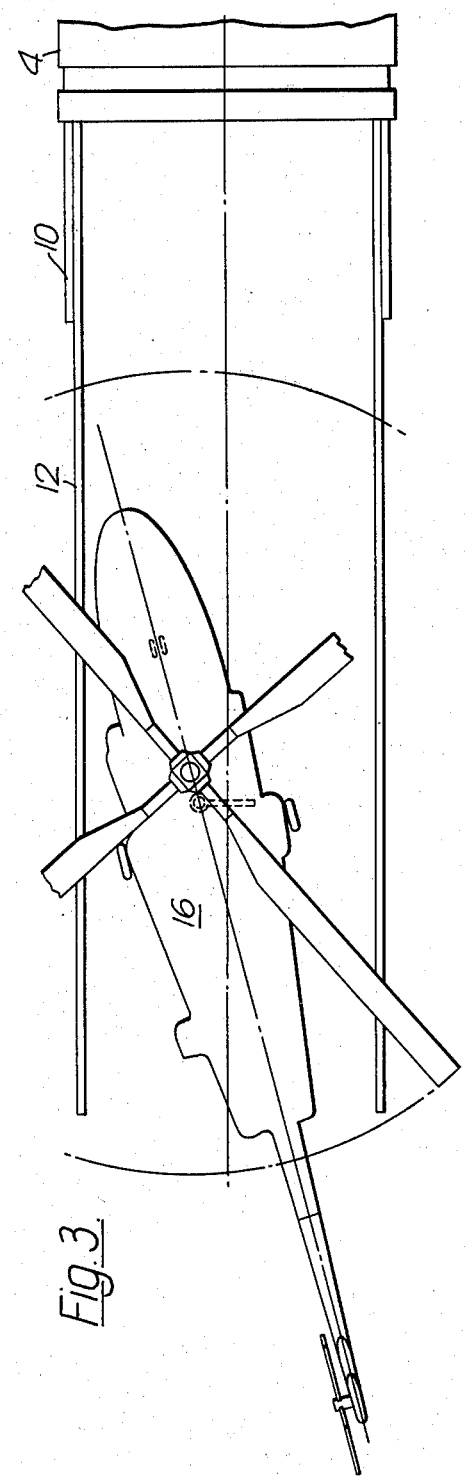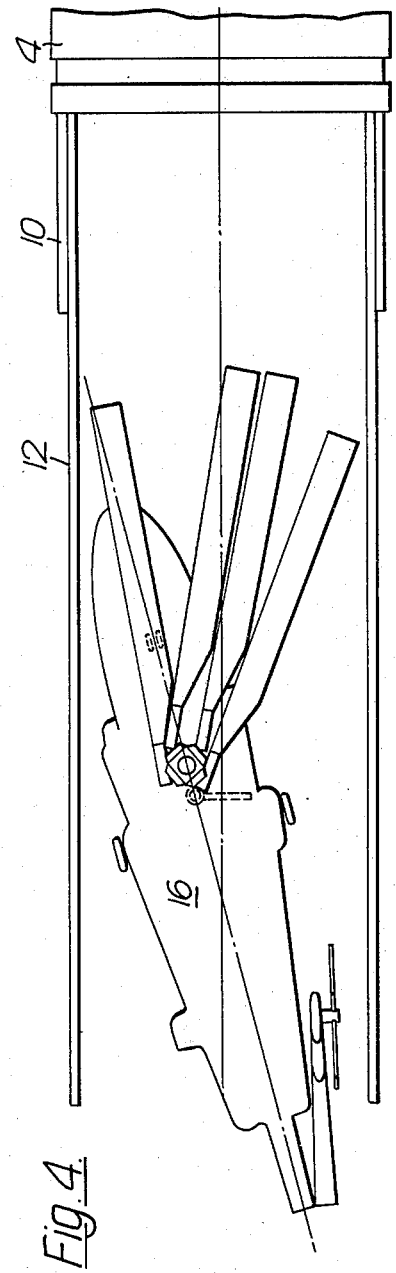
Fig. 3
Fig. 4

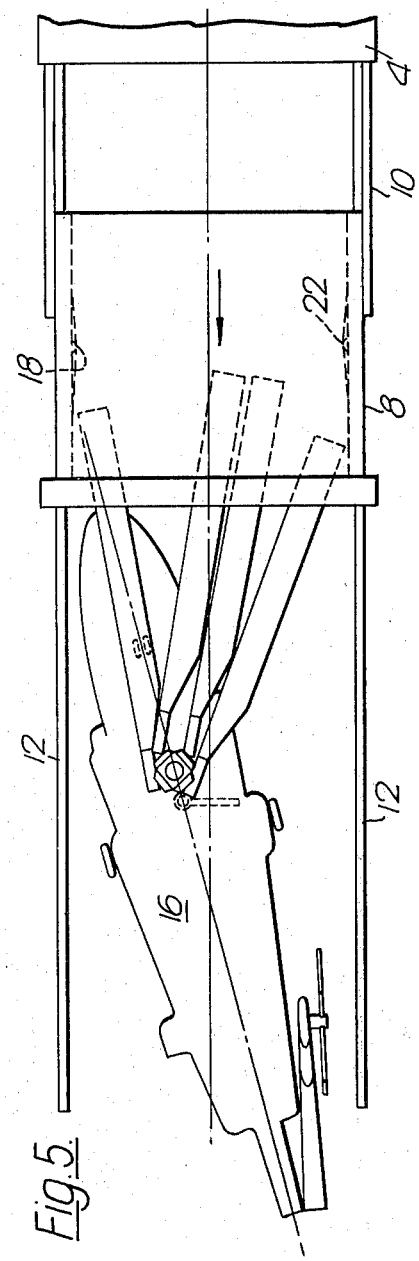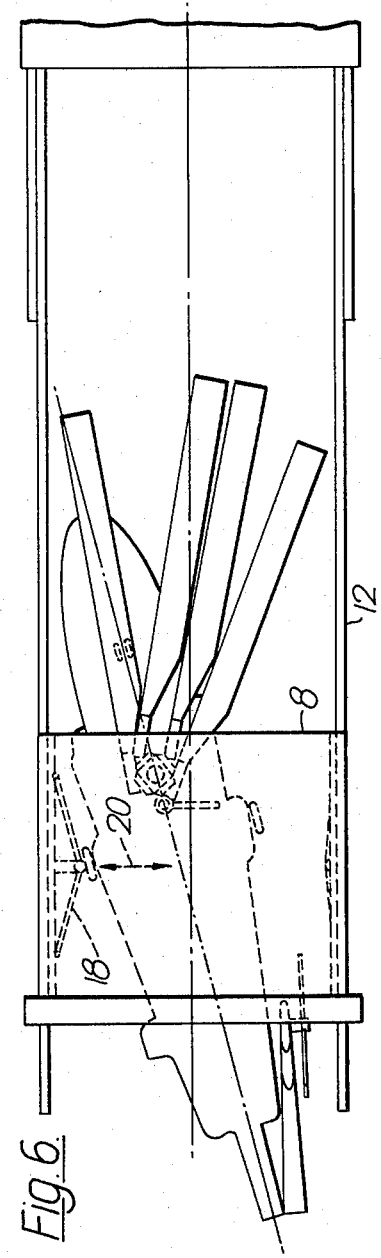

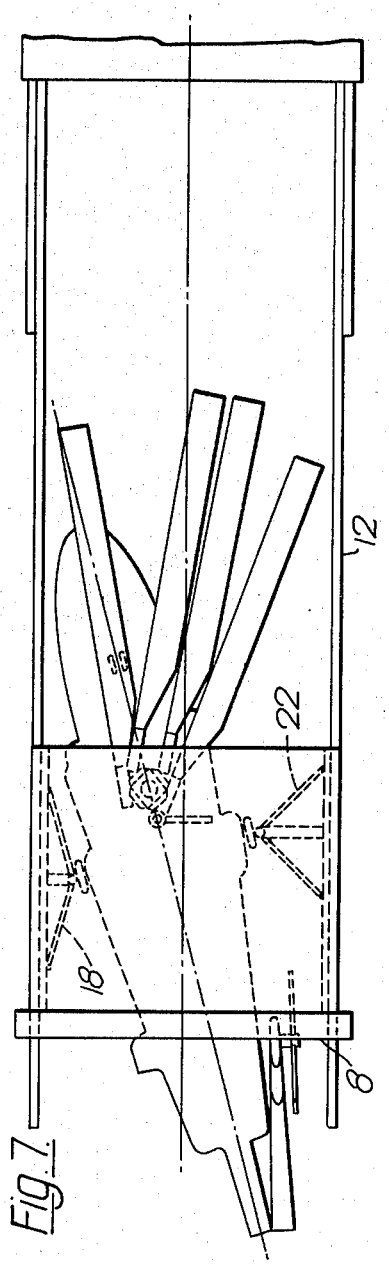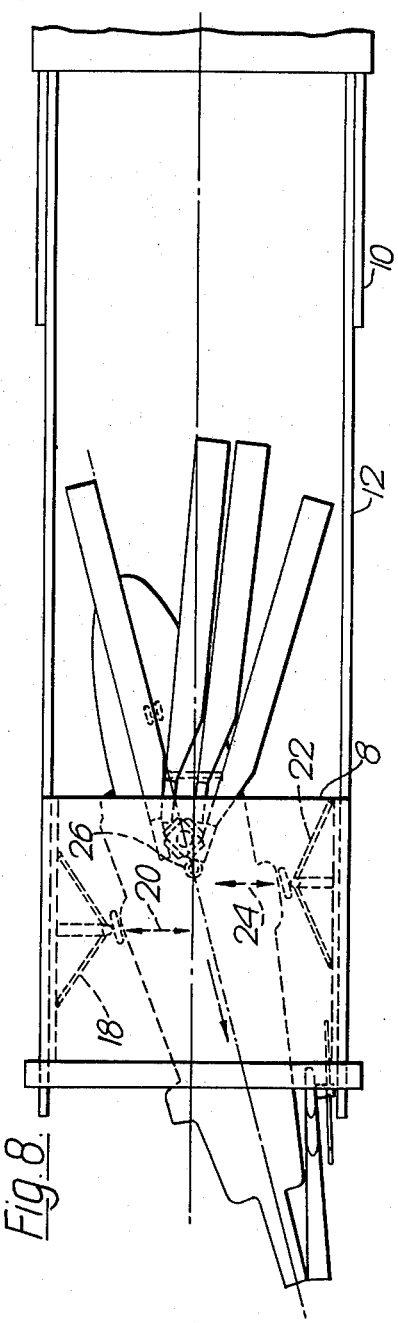

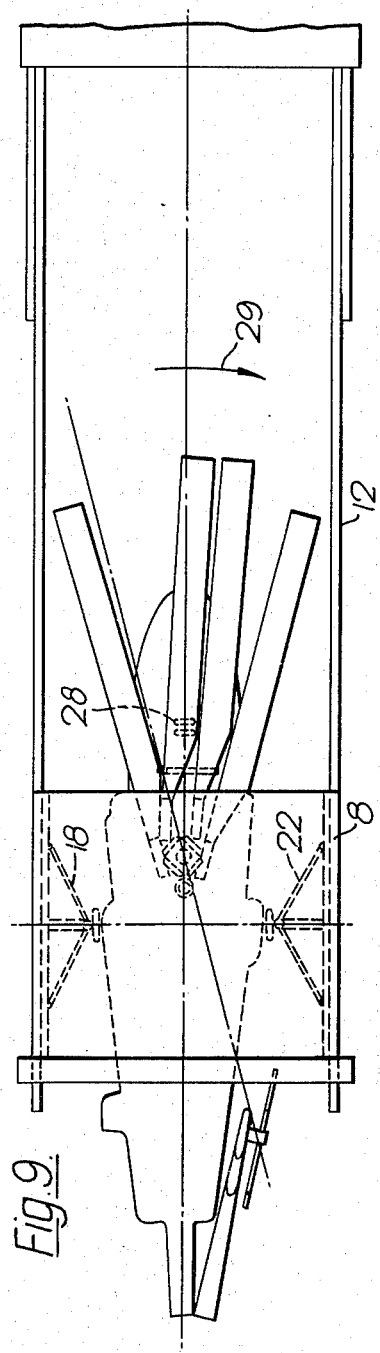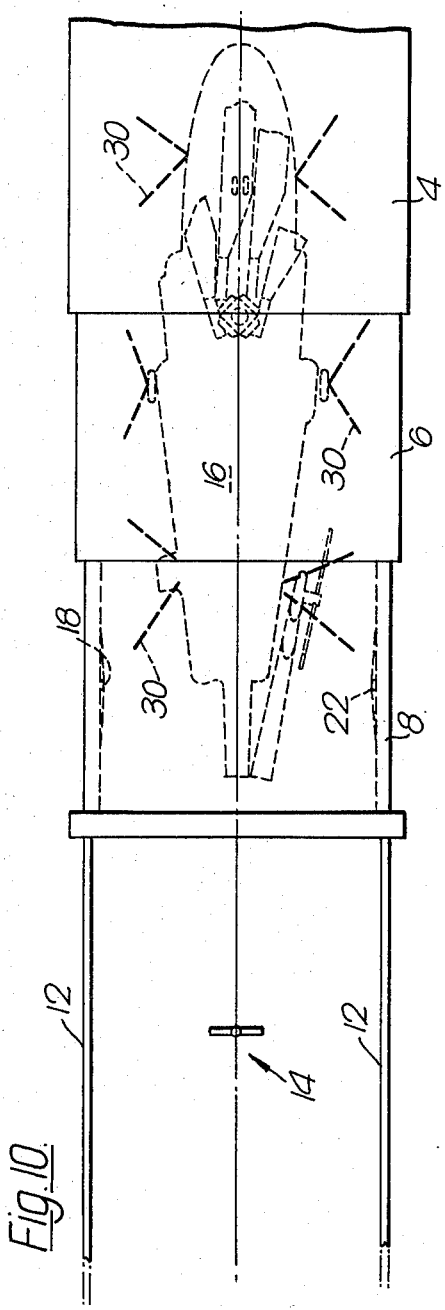
Fig.9.
Fig.10.

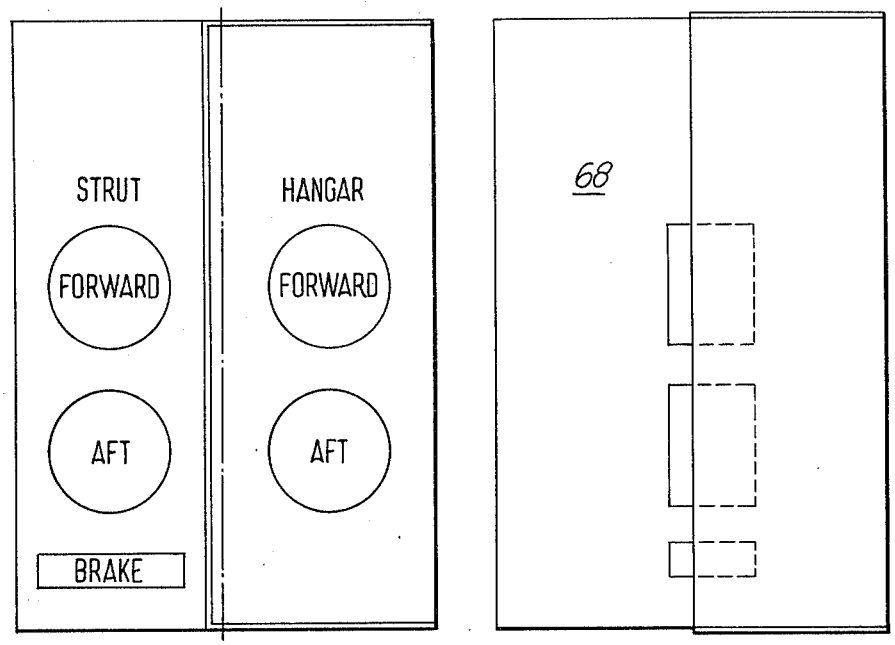

TRAVERSING AND HOUSING SYSTEM FOR HELICOPTERS

The present invention relates to a traverse strut assembly, for example, for use with a traversing and housing system for a helicopter.

A telescopic hangar which may be used on board ship for the deck storage of helicopters is described in British Pat. No.930,814. This hangar may be extended to enclose the helicopter once it has landed. However, as helicopters require a clear space in which to land and take off the retracted hangar has to be spaced a suitable distance from the landing pad. On the flight deck of a ship, where space is limited it may be impractical to extend the hangar to enclose the helicopter on the landing pad and therefore the helicopter has to be moved into the hangar. However, it is necessary to ensure that the helicopter is secured to the flight deck during its traversing movement so that it is not adversely affected by wind or by pitching and rolling motions of the ship due to the sea state. Tension cables could be used to pull the helicopter into the hangar but have been found to be hazardous and unreliable.

It is one object of the invention to provide a traverse strut assembly which can be used to secure and guide a helicopter or the like during a traversing operation.

According to a first aspect of the present invention there is provided a traverse strut assembly comprising connection means and at least first and second elongate supporting struts, one end of each strut being pivotally connected to said connection means and the other end of each strut being movably mounted with respect to a support assembly so that said connection means is movable in a first directions and is prevented from movement in the two direction orthogonal to said first direction, Preferably, the support assembly comprises first and second support rails which extend perpendicular with respect to one another, said other end of the first strut being pivotally connected to a first slider slidable with respect to said first support rail, and said other end of the second strut being pivotally connected to a second slider slidable with respect to said second support rail.

In a preferred embodiment of the invention a third elongate supporting strut is pivotally connected at one end to said connection means, the other end of the third strut being movably mounted with respect to said support assembly. In the embodiment in which the support assembly comprises first and second support rails the said other end of the third strut is pivotally connected to a third slider slidable with respect to said first support rail. In this case, the first and third struts extend away from said connection means in substantially opposite directions.

Preferably, each support rail comprises an elongate channel member in which each respective slider is received for sliding movement relative thereto.

In a preferred embodiment co-operating members of a brake are mounted on at least one slider and its support rail for preventing movement of the slider relative to the support rail upon engagement of said co-operating members. The brake may comprise a solenoid operated member mounted on said slider for engagement with a plurality of serrations on the respective support rail. In the case where two sliders are slidable relative to the first support rail it is advantageous to provide the co-operating brake members on the second slider and second support rail.

In one embodiment of the invention the support assembly is movably mounted with respect to two spaced elongate fixed rails extending substantially parallel with respect to one another. The support assembly may be provided with rollers for movement along the fixed rails. Preferably, the support assembly is moved via a powered screw-drive.

The traverse strut assembly is particularly useful for securing and guiding a helicopter during a traversing operation. In this instance a respective traverse strut assembly is mounted on each of opposing internal surfaces of a movable hangar section. At least one of the traverse strut assemblies is mounted on the respective surface by means of said fixed rails for movement along said surface longitudinally with respect to said hangar section.

According to a further aspect of the present invention there is provided a traversing and housing system comprising a telescopic hangar or like structure having a section fixed to a firm base, tracks fixable to the base and extending away from one end of each side of the fixed section, one or more movable sections movable along the tracks from a retracted position where they are telescoped within one another and within the fixed section, to an extended position with all the sections substantially in end to end relationship, wherein connecting means are arranged within the end movable section furthest from said fixed section, said connecting means being arranged to secure a helicopter or the like enclosed within said movable section.

Preferably, the end movable section is detachably coupled to the adjoining hangar section.

Preferably said connecting means comprises two traverse strut assemblies as described above fixed to the internal surface of the end movable section, said two strut assemblies being spaced from and arranged substantially opposite to one another.

At least one of said assemblies may be longitudinally movable with respect to the end movable section.

The invention also extends to a method for traversing a helicopter into a hangar, the hangar having a fixed section and at least one movable section which may be telescoped within the fixed section, the method comprising the steps of moving said movable section to enclose the helicopter, securing the helicopter to the inner surfaces of said movable section, traversing the movable section and hence the helicopter to within the fixed section, releasing the helicopter from the movable section and moving the movable section into an end to end relationship with said fixed section or an adjoining movable section to enclose the helicopter.

Figure 12:
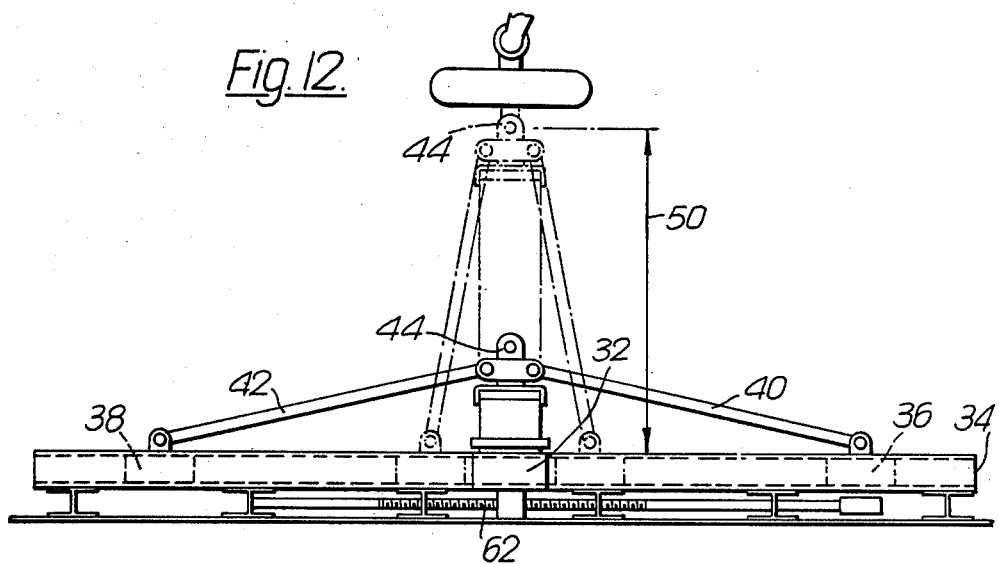
Figure 13:
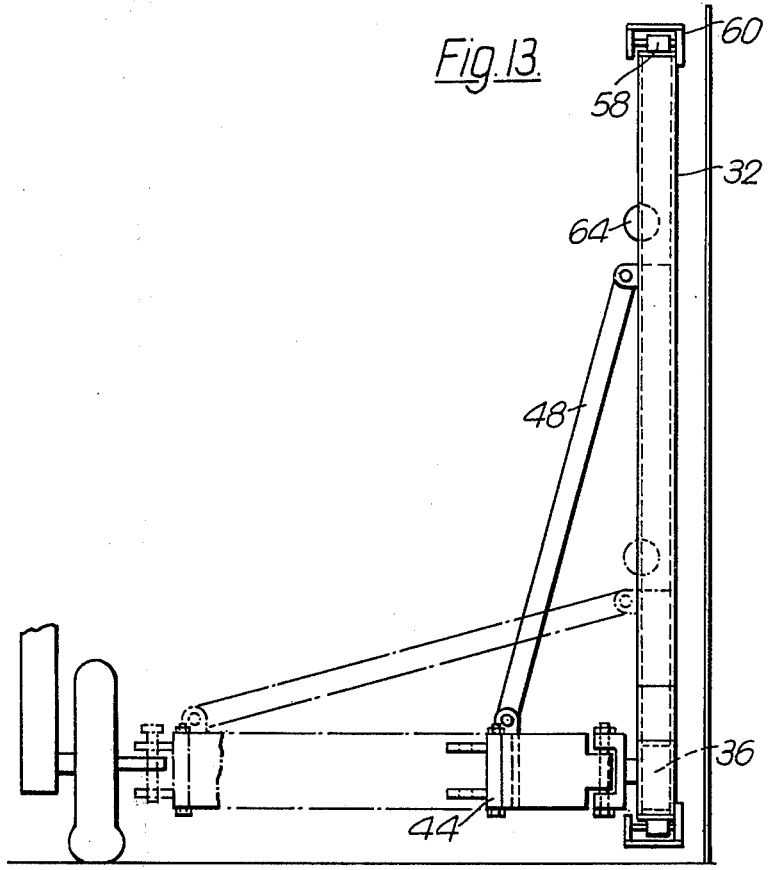

Embodiments of the present invention will hereinafter be described, by way of example, with reference to the accompanying drawings, in which:

FIGS. 1 to 10 show in sequence an operation for traversing a landed helicopter into a telescopic hangar, FIG. 11 shows a side elevation of a traverse strut assembly for securing a helicopter, FIG. 11a shows a section through a channel member of the strut assembly taken on the line A—A of FIG. 11, FIG. 12 shows a plan view of the traverse strut assembly of FIG. 11, FIG. 13 shows an end elevation of the traverse strut assembly of FIG. 11, and FIG. 14 shows a control unit for a telescopic hangar including traverse strut assemblies.

FIG. 1 shows a plan view of a telescopic hangar 2 having a fixed section 4 which is fixed to a flight deck of a ship. The hangar 2 also includes two movable sections 6 and 8 movable to the extended position of FIG. 1 along tracks 10 and 12 respectively (FIG. 2) provided in the flight deck. The movable sections 6 and 8 may be telescoped one within the other and within the fixed section 4 as is indicated in FIG. 2. In the telescoped position the end movable section 8 is the innermost section of the hangar.

The telescopic hangar 2 is preferably constructed and arranged as described in British Pat. No.930,814 except that the end movable section 8 is detachable from the adjoining movable section 6. Although only two movable sections 6 and 8 are shown in the drawings any number thereof may be provided as required. Alternatively, the end movable section 8 could be adjoined directly to the fixed section 4.

The telescopic hangar 2 is fixed to the flight deck in alignment with a landing area, preferably incorporating a recovery assist and secure system indicated at 14. As is indicated in FIG. 2 the hangar 2 is initially telescoped so that it is sufficiently spaced from the landing area to provide clearance for a helicopter to land. Once a helicopter 16 has landed, as shown in FIG. 3, it is secured to the flight deck by any suitable means. For example, the helicopter could be secured to the flight deck by means of a helicopter recovery system as described in British Pat. No.1,449,442. Thereafter, as shown in FIG. 4, the helicopter blades and tail assembly are folded. As shown in FIG. 5, the end movable section 8 of the hangar 2 is then detached from the hangar 2 and is moved towards the helicopter 16 along the tracks 12 until it encloses the helicopter 16 with a fixed traverse strut assembly 18 mounted on the port wall of the movable section 8 aligned with the main landing gear axle on the port side of the helicopter. The traverse strut assembly 18 will be described in detail below. When the traverse strut assembly 18 is aligned with the axle fitting it is connected thereto as indicated in FIG. 6. The traverse strut assembly 18 is only movable laterally, that is, in the direction at right angles to the port wall of the movable section 8 indicated by the arrow 20.

A second traverse strut assembly 22 is mounted on the starboard wall of the movable section 8 substantially opposite to the assembly 18. The strut assembly 22 is mounted for movement along the wall of the movable section 8 longitudinally with respect thereto and is moved into alignment with the main landing gear axle on the starboard side of the helicopter 16 and is connected thereto as indicated in FIG. 7. It will thus be seen that the helicopter 16 is then secured to and enclosed by the movable section 8 of the hangar 2. Accordingly, the means securing the helicopter 16 to the flight deck are released. The second traverse strut assembly 22 is movable longitudinally with respect to the movable section 8 as noted above and is also movable laterally, that is, in the direction at right angles to the starboard wall indicated by the arrow 24. The construction of the traverse strut assembly 22 will be described in detail below.

The movable section 8 is then moved further from the hangar 2 to align the centre of gravity thereof or a messenger winch 26 with the centre-line of the hangar 2 as shown in FIG. 8. The ability of the traverse strut assemblies 18 and 22 to move laterally prevents any load build-up on the helicopter 16 due to tire side friction. The nose wheel 28 of the helicopter is then turned through 90° as shown in FIG. 9 and the helicopter is then rotated by moving the traverse strut assembly 22 longitudinally with respect to the movable section 8. As the port strut assembly 18 is not movable longitudinally the port main wheel acts as a pivot and the helicopter is rotated until its longitudinal axis is parallel to the centre-line of the hangar 2.

The starboard strut assembly 22 is then locked to prevent lateral movement thereof. This prevents lateral drift of the helicopter during the movement thereof. The movable section 8 is then moved along the tracks 12 towards and into the movable section 6 of the hangar 2 and thereby guides and moves the helicopter 16 into the hangar 2. When the helicopter reaches the position shown in FIG. 10 relative to the movable section 6 and the fixed section 4 of the hangar 2, movement of the movable section 8 is stopped. Tie-downs 30 are then applied to the helicopter. The traverse strut assemblies 18 and 22 are then disconnected from the helicopter axle fittings and are moved laterally against the respective wall of the movable section 8 where they are stowed. The movable section 8 is then moved away from the fixed section 4 and coupled to the movable section 6 in end to end relationship therewith. The helicopter is thus completely secured within the hangar 2 as indicated in FIG. 10. The helicopter can of course be traversed from the hangar to the landing area by reversing the procedure set out above.

The operation sequences described above are illustrated by the Sea Lynx Helicopter which has a nose wheel. Of course, the described operation can be used with other helicopters with or without a nose wheel. Interface with skid type helicopters can be accomplished with a skid trolley and adapter.

The two traverse strut assemblies 18 and 22 are basically identical, but assembly 22 is mounted for longitudinal movement relative to the movable section 8. Traverse strut assembly 22 will now be described with reference to FIGS. 11 to 13.

FIG. 11 shows an elevation of the traverse strut assembly 22 taken from inside the movable section 8. The assembly 22 comprises two elongate channel members 32 and 34 arranged at right angles with respect to one another and fastened together to form an inverted TEE. The size of these members would vary with the helicopter type, hangar characteristics and type of operations. For the layout shown in FIGS. 1 to 10, the horizontally extending channel member 34 would be approximately ten feet and the vertically extending channel member 32 would be approximately eight feet in length. A cross-section of vertical channel member 32 is shown in FIG. 11a and this would have a width of approximately eight inches and a depth of approximately three inches. The horizontal channel member 34 would preferably have an identical cross-sectional shape and size.

Two sliders 36 and 38 are located in the horizontal channel 34 for sliding movement therealong. Each slider 36, 38 is pivotally connected to one end of a respective horizontal strut 40, 42 (Fig. 12). The other end of each horizontal strut 40, 42 is pivotally connected to a connector 44 for connection to the wheel axle of the helicopter main landing gear. Similarly, a further slider 46 is located in the vertical channel 32 for sliding movement therealong. The further slider 46 is pivotally connected to one end of a vertical strut 48 (Fig. 13), the other end of the vertical strut 48 being pivotally connected to the connector 44. It will thus be seen that the connector 44 is free to move laterally, that is, in the direction normal to the wall of the movable section as indicated by the arrow 50 (FIG. 12). However, the further slider 46, vertical channel 32 and vertical strut 48 prevent any lateral movement of the connector 44, that is horizontal movement along the wall of the movable section. Similarly, the sliders 36 and 38, the horizontal channel 34 and the horizontal struts 40 and 42 prevent any movement of the connector 44 vertically along the wall of the movable section.

It will be seen from FIG. 11 that the traverse strut assembly 22 is kept rigid by braces 52 and 54 which are attached to and extend from the horizontal channel 34 to a horizontal support rail 56 carried by the vertical channel 32.

The horizontal channel 34 and the horizontal support rail 56 carry rollers 58 received in spaced fixed horizontal rails 60. The assembly 22 is thus movable along the rails 60 and hence longitudinally of the movable section 8. In the embodiment shown the assembly 22 is able to move up to two feet towards or away from the fixed section 4. Movement of the assembly 22 is produced by means of a screw-drive 62 coupled to a motor and gearbox drive.

A solenoid operated brake 64 is mounted to the vertical slider 46 and in the "ON" position (power off) engages co-operating serrations 66 provided on the vertical channel 32 and thus prevents any lateral movement of the wheel connector 44.

In FIGS. 3 to 10 the traverse strut assembly 22 is affixed to the starboard wall of the movable section 8. The assembly 22 is affixed thereto by bolting the rails 60 to the wall thereof. The powered screw-drive 62 and the gear-box and motor therefor are housed in cut-outs in the walls.

The traverse strut assembly 18 is identical to the assembly 22 described above but does not have the rollers 58 nor the rails 60. The channels 32 and 34 and the braces 52 and 54 of the assembly 18 are bolted directly to the port wall of the movable section 8. As the assembly 18 is fixed to the wall of the movable section 8 the powered screw-drive is not required. In addition, the solenoid operated brake is preferably omitted.

In installations where the longitudinal movement of the traverse strut assembly 22 may be limited with respect to the hangar length, the traverse strut assembly 18 may also be mounted for longitudinal movement. Thus, each traverse strut assembly 18 and 22 can take up half of the required travel.

A control unit for both the hangar and the longitudinally movable traverse strut assembly is schematically illustrated in FIG. 14. This control unit is very similar to that used for controlling cranes. A cover 68 is incorporated to prevent the operation of the hangar traverse and the strut traverse at the same time. The power requirement for the strut traverse would be three horsepower or less.

The traverse strut assemblies can be retro-fitted to existing telescopic hangars. The hangar modifications would consist of an unlatching mechanism to allow the inner section to detach from the remainder of the hangar, a hangar to hangar seal kit and a longer power cable.

The ship modification would consist of extending the tracks for the inner section to the landing area. Surface or flush tracks could be used. No other ship modifications are required.

The system described above has the advantage that the helicopter is completely secured throughout the traversing operation. When used with a Recovery Assist and Secure System the helicopter is completely secured from touchdown to hangaring. The system does not use any tension cables which are hazardous, and the control system is very simple and reliable. During the attachment of the system to the helicopter main landing gear the crewman is sheltered inside the hangar.

The system described above also has the advantage that the risk of damage to the helicopter and personnel is less than with present systems.

The system has a low cost, is light weight, and is very simple compared to alternate devices.

What is claimed is :

1. A traversing and housing system comprising; a telescopic hangar structure having an enclosure section fixed to a firm base, tracks fixable to the base and extending away from one end of each side of the fixed section, one or more movable enclosure sections movable along the tracks from a retracted position where they are telescoped within one another and within the fixed enclosure section, to an extended position with all the sections substantially in end to end relationship, connecting means coupled to and arranged within a movable section furthest from said fixed section, said connecting means being arranged to secure a movable vehicle enclosed within said movable section when said movable section is at its extended position or being moved.

2. A method for traversing a movable vehicle into a hangar, the hangar having a fixed enclosure section and at least one movable enclosure section which may be telescoped within the fixed section, the method comprising the steps of; moving said movable section to enclose the vehicle, securing the vehicle to the inner surfaces of said movable section, traversing the movable section and the secured vehicle to a position within the fixed section, releasing the vehicle from the movable section, and moving the movable section into an end to end relationship with said fixed section to enclose the vehicle.

3. A shipboard traversing and housing system for a helicopter vehicle comprising a telescopic hangar structure having a section fixed to a firm base, tracks fixed to the base and extending away from one end of each side of the fixed section, one or more movable enclosure sections movable along the tracks from a retracted position where they are telescoped within one another within the fixed section to an extended position with all the sections substantially in end to end relationship, connecting means coupled to and arranged within an end movable section farthest from the fixed section, the connecting means being adapted for secure attachment to the helicopter and attached to the end movable section so as to be movable laterally but not movable longitudinally to secure said helicopter to said movable section as it is moved into said fixed section.

4. The shipboard traversing and housing system of claim 3, further comprising means for coupling the connecting means to the movable end section including a connection end member and at least first and second elongate supporting rigid strut members, one end of each strut member being pivotally connected to the connection end member and the other end of each strut member being movably mounted with respect to a support assembly so that the connection end member is movable in a first direction and is prevented from movement in the two directions orthogonal to the first direction.

* * * * *